United States Patent [19]

Asai et al.

[11] Patent Number: 5,352,746
[45] Date of Patent: Oct. 4, 1994

[54] LIQUID CRYSTAL POLYESTER RESIN COMPOSITION IMPROVED IN FLUIDITY

[75] Inventors: Kuniaki Asai, Tondabayashi; Itaru Nitta, Tsukuba, both of Japan

[73] Assignee: Sumitomo Chemical Company, Limited, Osaka, Japan

[21] Appl. No.: 860,558

[22] Filed: Mar. 30, 1992

Related U.S. Application Data

[63] Continuation of Ser. No. 510,188, Apr. 17, 1990, abandoned.

[30] Foreign Application Priority Data

May 11, 1989 [JP] Japan .................. 1-120057
Jan. 19, 1990 [JP] Japan .................. 2-011643

[51] Int. Cl.⁵ .................................................. C08L 67/03
[52] U.S. Cl. .................................. 525/444; 525/437; 525/450
[58] Field of Search .................. 525/437, 444, 450

[56] References Cited

U.S. PATENT DOCUMENTS

| | | | |
|---|---|---|---|
| 4,414,365 | 11/1983 | Sugimoto | 525/437 |
| 4,563,508 | 1/1986 | Cottis | 525/444 |
| 4,581,399 | 4/1986 | Yoon . | |
| 4,650,836 | 3/1987 | George | 525/444 |

FOREIGN PATENT DOCUMENTS

| | | |
|---|---|---|
| 0071968 | 2/1983 | European Pat. Off. . |
| 0376615 | 7/1990 | European Pat. Off. . |
| 47-47870 | 12/1972 | Japan . |
| 56-18016 | 4/1981 | Japan . |
| 59-85733 | 5/1984 | Japan . |
| 62-4722 | 1/1987 | Japan . |
| 63-3888 | 1/1988 | Japan . |
| 63-3981 | 1/1988 | Japan . |
| 63-137950 | 6/1988 | Japan . |
| 2158832 | 11/1985 | United Kingdom . |

OTHER PUBLICATIONS

Chemical Abstracts, vol. 82, No. 12, 16th Jun. 1975, p. 40, abstract No. 157250x, Columbus, Ohio, US; & JP-A-74 129 745 (Nihon Ekonol K.K.) Dec. 12, 1974.

*Primary Examiner*—Patricia A. Short
*Attorney, Agent, or Firm*—Stevens, Davis, Miller & Mosher

[57] ABSTRACT

A liquid crystal polyester resin composition improved in fluidity which comprises 100 parts by weight of liquid crystal polyester and 0.5–10 parts by weight of an oligomer comprising a repeating structural unit of the formula

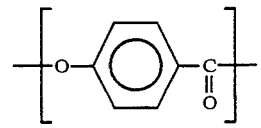

as the main component and having a flow temperature determined by a specified method which is in the range of 160°–350° C. and is at least 20° C. lower than the flow temperature of the liquid crystal polyester to be combined therewith.

4 Claims, No Drawings

LIQUID CRYSTAL POLYESTER RESIN COMPOSITION IMPROVED IN FLUIDITY

This application is a continuation of application Ser. No. 07/510,188, filed Apr. 17, 1990, now abandoned.

BACKGROUND OF THE INVENTION

The present invention relates to a liquid crystal polyester resin composition which has been markedly improved in fluidity, particularly fluidity in molding thin-walled articles, with virtually no deterioration in the mechanical property and heat resistance inherent to liquid crystal polyester.

The technologies in the field of electronics are making a spectacular advance in recent years. In electronic parts such as relay parts, coil bobbins, connectors etc., with the progress toward smaller-sized or thinner-walled products, high levels of performances have come to be required, including high dimensional accuracy, high strength, high rigidity and high solder heat resistance.

Liquid crystal polyester undergoes almost no entanglement between its molecular chains in melting, so that it shows a very low melt viscosity and its molecular chains can be highly oriented in the direction of flow by a small shearing force. Accordingly, molded articles obtained from liquid crystal polyester have high strength and high rigidity though they are highly anisotropic. Further, liquid crystal polyester can provide such thin wall molded articles that have not been obtainable from prior crystalline or amorphous engineering plastics, and can, depending on the structure of the liquid crystal polyester, give articles having a solder heat resistance superior to that of polyphenylene sulfide. For these reasons, liquid crystal polyesters are rapidly coming into wide use as the material for electronic parts.

In the field of electronics, however, with the progress in surface mounting techniques etc. attendant on the trend toward devices of higher integration, increasingly higher level of performances have come to be required for the electronic parts mounted thereon. For example, these parts are required, at a wall thickness of as low as 0.1–0.3 mm, to have mechanical properties including strength and rigidity and heat resistances including solder heat resistance and heat distortion temperature which are equal or superior to those of the products of prior art. The heat resistance and the fluidity in molding thin-walled articles are contradictory to each other, polymers with more excellent fluidity having lower heat resistance. Even in liquid crystal polyesters, few polyesters have been known which can fully meet such requirements for performances.

THE OBJECTS AND SUMMARY OF THE INVENTION

The object of the present invention is to improve the fluidity, particularly the fluidity in molding thin-walled articles, (said fluidity being hereinafter referred to as "thin wall fluidity") of a liquid crystal polyester composition without substantially deteriorating the mechanical property and heat resistance inherent to liquid crystal polyester and thereby to provide electronic parts etc. which can exhibit high level of performances required.

The present inventors have made extensive study to solve the above-mentioned problems and resultantly found that the above-mentioned object can be achieved by adding to liquid crystal polyester a specific amount of an oligomer comprising a repeating structural unit of the formula

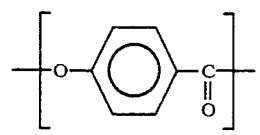

as the main component and having a specific flow temperature. The present invention has been attained on the basis of the above finding.

Thus, according to the present invention, there is provided a liquid crystal polyester resin composition improved in fluidity which comprises 100 parts by weight of liquid crystal polyester and 0.5–10 parts by weight of an oligomer comprising a repeating structural unit of the formula

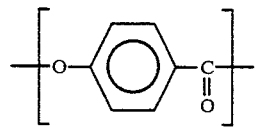

as the main component and having a flow temperature which is in the range of 160°–350° C. and is at least 20° C. lower than the flow temperature of the liquid crystal polyester to be combined therewith, said flow temperature being the temperature at which a heat-molten polymer or oligomer shows a melt viscosity of 48,000 poises when extruded through a nozzle by using a capillary rheometer fitted with a nozzle 1 mm in inner diameter and 10 mm in length at a temperature-increasing rate of 4° C./minute.

DETAILED DESCRIPTION OF THE INVENTION

As an example of attempts to improve the melt processability of liquid crystal polymer, Japanese Patent Application Kokai (Laid-open) No. 59-85733 discloses the addition to liquid crystal polymer a small amount of a low molecular liquid crystal of N,N'-bis(p-phenylbenzylidene)-α,α'-bi-p-toluidine or the like capable of forming an anisotropic melt phase, but it discloses nothing about the oligomer having the structure of the present invention.

On the other hand, Japanese Patent Application Kokai (Laid-open) No. 62-4722 discloses a method of producing a liquid crystal polyester of enhanced properties by copolymerizing an oligomer derived from p-hydroxybenzoic acid with an oligo-ester or polyester obtained by the reaction of a dicarboxylic acid and a diol. Further, Japanese Patent Application Kokai (Laid-open) No. 63-137950 discloses a method of improving the degree of crystallization of a crystalline resin such as polyethylene terephthalate by adding thereto a liquid-crystalline oligomer comprising the repeating structural unit of the formula

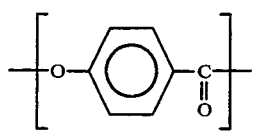

as the main component. The Applications, however, both describe nothing of the fact that when the oligomer comprising the repeating structural unit of the formula

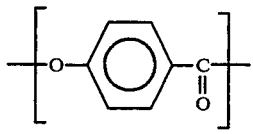

is added to liquid crystal polyester, the fluidity is markedly improved as disclosed in the present invention.

The liquid crystal polyesters used in the present invention refer to those polymers which even in molten condition do not assume an amorphous state, are anisotropic and are highly oriented. They are polyesters generally called a thermotropic liquid crystal polymer. Typical examples thereof include the reaction products formed from (1) a combination of an aromatic dicarboxylic acid, an aromatic diol and an aromatic hydroxycarboxylic acid,
(2) different kinds of aromatic hydroxycarboxylic acids,
(3) a combination of an aromatic dicarboxylic acid and a ring-substituted aromatic diol, and
(4) a polyester, such as polyethylene terephthalate, and an aromatic hydroxycarboxylic acid. They are polymers which form an anisotropic melt at a temperature not higher than 400° C. In place of the above-mentioned aromatic dicarboxylic acids, aromatic diols and aromatic hydroxycarboxylic acids, there may sometimes be used the ester-forming derivatives thereof. The repeating structural units of said liquid crystal polyesters are exemplified by the following formulas, but they are not limited thereto.

Further, mixtures of two or more kinds of liquid crystal polyesters may be used in the present invention. Repeating structural units originated from aromatic dicarboxylic acid:

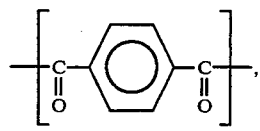

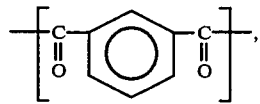

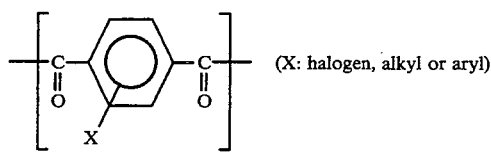 (X: halogen, alkyl or aryl)

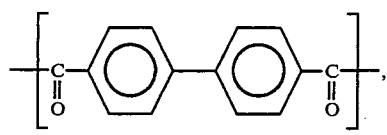

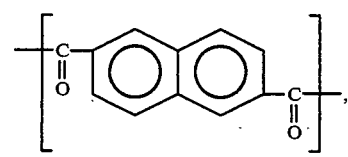

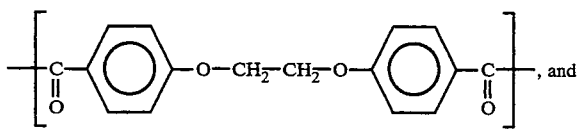, and

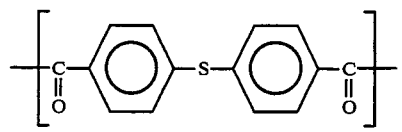

Repeating structural units originated from aromatic diol

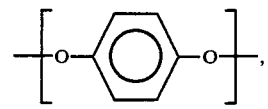

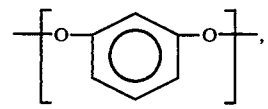

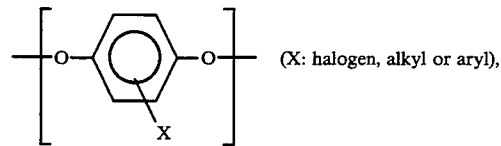 (X: halogen, alkyl or aryl),

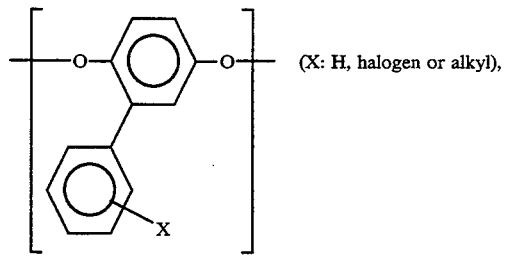 (X: H, halogen or alkyl),

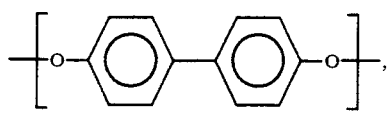

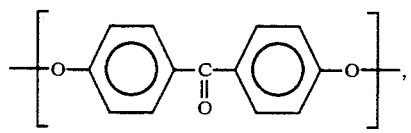

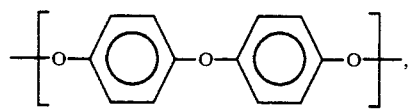

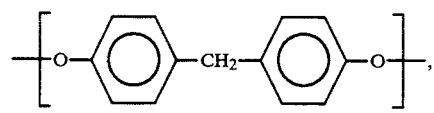

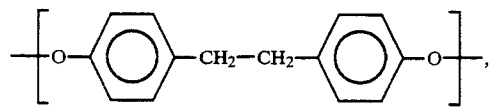

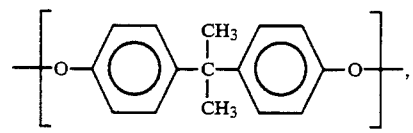

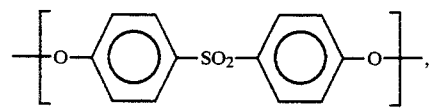

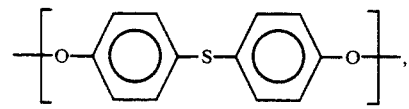

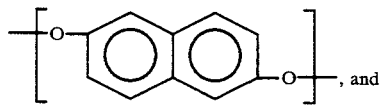

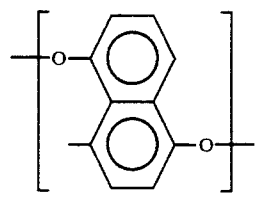

Repeating structural units originated from aromatic hydroxycarboxylic acid

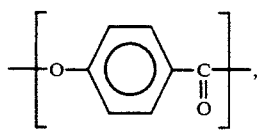

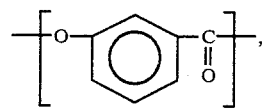

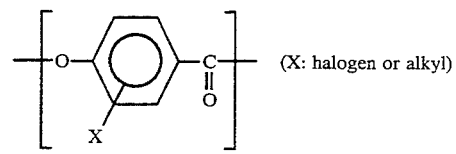 (X: halogen or alkyl)

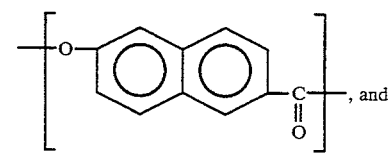, and

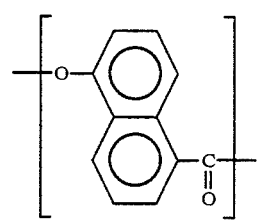

Particularly preferred liquid crystal polyesters from the viewpoint of the balance between heat resistance, mechanical property and processability are those which contain the repeating structural unit of the formula

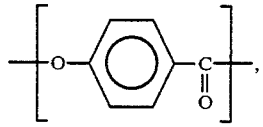, specifically those which comprise a combination of repeating structural units represented by the following formulas (I)–(IV) or mixtures thereof.

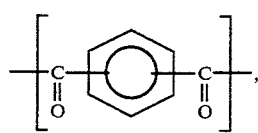 (I)

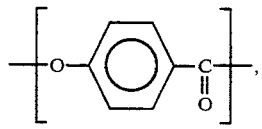,

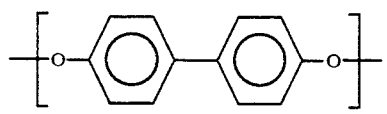

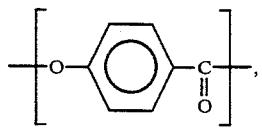, (II)

-continued

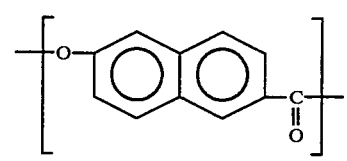

(III)

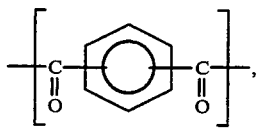

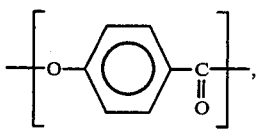

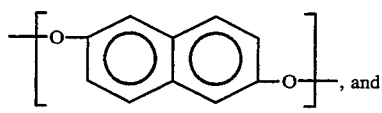, and (IV)

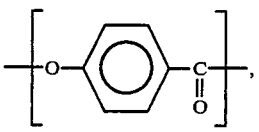

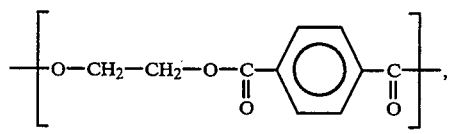

The liquid crystal polyesters having the combinations of repeating structural units (I), (II), (III) and (IV) are respectively described, for example, in Japanese Patent Application Kokoku (Post-Exam. Publn.) Nos. 47-47870, 63-3888, 63-3891, and 56-18016.

The oligomers comprising the repeating structural unit of the formula

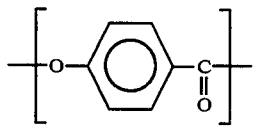

and having a specific flow temperature used in the present invention refer to those which are composed of said repeating structural unit alone (hereinafter abbreviated as POB oligomer) and those which are composed of combinations of said repeating structural unit with other repeating structural units (hereinafter abbreviated as copolymer oligomer). They can be obtained through conventional methods called the acetylation method or the phenyl-esterification method by a solution polymerization using a solvent of a high boiling point or a melt polymerization containing substantially no solvent.

Examples of the method of synthesis of POB oligomer are described below. In the acetylation method, an oligomer composed theoretically of n (n being an integer) repeating structural units (hereinafter sometimes referred to as theoretical n-mer) can be prepared by reacting 1 mole of p-acetoxybenzoic acid and stopping the reaction at the point of time when $(n-1)/n$ mole of acetic acid has been distilled out, or by reacting $(n-1)/n$ mole of p-acetoxybenzoic acid with $1/n$ mole of p-hydroxybenzoic acid to distil $(n-1)/n$ mole of acetic acid out. In the latter method, further, the oligomer of theoretical n-mer can also be prepared by preliminarily reacting 1 mole of p-hydroxybenzoic acid with $(n-1)/n$ mole of acetic anhydride to obtain $(n-1)/n$ mole of p-acetoxybenzoic acid and making polycondensation proceed continuously. Also in the phenyl-esterification method, the oligomer of theoretical n-mer can be prepared in a similar manner to the acetylation method but by using the phenyl ester of p-hydroxybenzoic acid and distilling phenol out.

The same method can be applied also to the synthesis of the copolymer oligomers. Thus the copolymer oligomers can be prepared from p-hydroxybenzoic acid and/or its derivatives and an aromatic carboxylic acid such as terephthalic acid, isophthalic acid etc. and/or its derivatives, and an aromatic diol such as hydroquinone, resorcinol, 4,4'-dihydroxydiphenyl, etc. and/or its derivatives.

Among these oligomers, preferred are POB oligomers from the fluidity improving effect exhibited when added to liquid crystal polyester, ease of synthesis, and economical advantage. Particularly preferred are those which have a carboxyl group and a hydroxyl group as the terminal groups from the viewpoint of chemical stability in molten state.

The flow temperature of the oligomer comprising the repeating structural unit of the formula

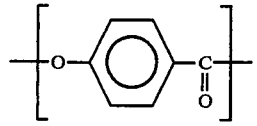

as the main component of the present invention is in the range of 160°–350° C. as determined by the above-mentioned method using a capillary rheometer and is lower by at least 20° C. than that of liquid crystal polyester to be combined therewith. When a mixture of two or more liquid crystal polyesters is used, it should be lower by at least 20° C. than the flow temperature of the mixture. When the flow temperature is lower than 160° C., although the fluidity improving effect is high, bubbles will be formed due to decomposition in melt-processing and particularly heat resistances including heat distortion temperature and solder heat resistance are greatly deteriorated. When the flow temperature exceeds 350° C., on the other hand, virtually no fluidity improving effect is recognized. Further, even when the flow temperature is within said range, virtually no effect is observed in improving the fluidity of the composition unless it is at least 20° C. lower than the flow temperature of the liquid crystal polymer to be combined.

The relation between the flow temperature and the molecular weight of the oligomer can be difficultly defined because oligomers having a flow temperature exceeding 250° C. cannot be dissolved completely in a solvent though those having a low flow temperature can be dissolved in special solvents such as tetrafluorophenol. However, the number average polymerization degree of the oligomer can be estimated by accurately determining the amount of distilled-out acetic acid in the acetylation method and the amount of distilled-out phenol in the phenyl-esterification method, and thus the correlation between the polymerization degree and the flow temperature can be established as described later in Examples.

The amount of the oligomer comprising the repeating structural unit of the formula

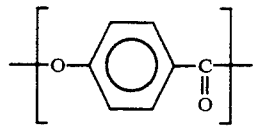

as the main component to be added in the present invention is in the range of 0.5–10 parts by weight relative to 100 parts by weight of the liquid crystal polyester resin, though it may vary depending on the flow temperature of the oligomer and the processing temperature of the liquid crystal polyester to which the oligomer is added. When the amount of the oligomer added is less than 0.5 part by weight virtually no effect of improving the fluidity of the liquid crystal polyester is recognized, whereas when it exceeds 10 parts by weight, although the fluidity improving effect is high, bubbles will be formed due to the decomposition of the oligomer in melt-processing and particularly heat resistances including heat distortion temperature and solder heat resistance are greatly deteriorated. From the viewpoint of the balance between fluidity improving effect, mechanical property and heat resistance, the amount of the oligomer to be added is preferably in the range of 1–8 parts by weight, particularly preferably in the range of 2–5 parts by weight, relative to 100 parts by weight of the liquid crystal polyester.

The composition of the present invention may be incorporated, according to necessity, with fibrous reinforcing materials such as glass fiber, silica-alumina fiber, wollastonite, carbon fiber, potassium titanate fiber etc., inorganic fillers such as calcium carbonate, talc, mica, clay, glass beads etc., solid lubricants typically represented by polytetrafluoroethylene and graphite, antioxidants, heat stabilizers etc. Molded articles obtained by processing liquid crystal polyesters are highly anisotropic although they show high strength and high modulus of elasticity, and are featured in that they are improved in anisotropy by being filled with fibrous reinforcing materials unlike usual crystalline resins and amorphous resins; so that they are in general filled with glass fiber etc. when applied to electronic parts and like uses. Accordingly, the composition of the present invention also is preferably filled with glass fiber.

The means of compounding the starting components for obtaining the molding material of the present invention is not particularly limited. The liquid crystal polyester and the oligomer comprising the repeating structural unit of the formula

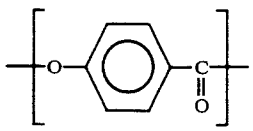

as the main component are usually mixed, according to necessity, with fillers such as glass fibers, pigments, heat stabilizers etc. by use of a Henschel mixer, tumbler, etc. and then melt-kneaded with an extruder.

The marked improvement in fluidity, particularly that in forming thin-walled articles, obtainable with virtually no deterioration in mechanical properties and heat resistances by the addition to liquid crystal polyester a specific amount of an oligomer comprising a repeating structural unit of the formula

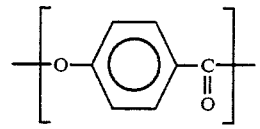

and having a specific flow temperature is estimated to be based on the following working mechanism.

The oligomer comprising the repeating structural unit of the formula

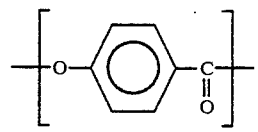

as the main component shows in the melt state an optical anisotropy when allowed to stand still or under applied pressure, furthermore shows a low melt viscosity owing to its low molecular weight and is completely compatible with liquid polyester, forming a uniform composition therewith, so that not only the fluidity can be markedly improved, but the inherent characteristic properties of liquid crystal polymer are not impaired.

DESCRIPTION OF THE PREFERRED EMBODIMENTS

The present invention will be described below with reference to Examples, but it is in no way limited thereto.

The physical properties shown in the Examples were determined by the following methods.

Flow temperature: The flow temperature was determined by use of a Koka flow tester (type CFT-500, mfd. by Shimadzu Corp.) and refers to the temperature at which a heat-molten resin or oligomer shows a melt viscosity of 48,000 poises when extruded through a nozzle of 1 mm inner diameter and 10 mm length under a load of 100 kg/cm$^2$ and at a temperature-increasing rate of 4° C./minute. The lower is the temperature, the higher the fluidity of the resin.

Optical anisotropy: The optical anisotropy of a resin in melt state was examined by visually observing a powdery resin or oligomer placed on a heating stage and heated at the rate of 10° C./minute under polarized light. When the resin or oligomer did not melt completely in mere standing still, melting was effected under applied pressure using a spring pressure.

Thin wall fluidity: The composition of the present invention was filled in melt state under a fixed injection conditions into a four-cavity mold, each cavity being a rectangle 0.3 mm in thickness, 46 mm in length and 5 mm in width, and the flow lengths in the length direction in the four rectangles were measured. The fluidity was expressed by the average value of the measured lengths.

Bending strength and flexural modulus: These were determined according to ASTM D-790 with test pieces for bending test 127 mm in length, 12.7 mm in width and 6.4 mm in thickness formed from the composition of the present invention.

Izod impact strength without notch: This was determined according to ASTM D-256 with a test piece prepared by dividing the test piece for bending test into two equal parts in the length direction.

Heat distortion temperature: This was determined according to ASTM D-648 by using the test piece for bending test. Heat distortion temperatures not higher than 280° C. were determined with an apparatus of oil bath type and those exceeding 280° C. were determined with an apparatus of air bath type.

Solder heat resistance: A rectangular test piece 1 mm in thickness, 46 mm in length and 5 mm in width was formed from the composition of the present invention, then immersed in a solder bath HA60A at 260° C. composed of 60% of tin and 40% of lead, and the temperature of the solder bath was increased at an increment of 5° C. while respective temperatures were maintained for 60 seconds. The solder heat resistance was expressed by the maximum temperature below which the test piece underwent no blistering nor distortion. For example, when blistering or distortion first occurs at 300° C., the solder heat resistance is 295° C.

The test pieces for determining the physical properties listed above including and following the thin wall fluidity were prepared by using an injection molding machine PS40E5ASE mfd. by Nissei Jushi Kogyo K.K.

Referential Example 1 (Preparation of liquid crystal polyester A)

In a polymerization vessel having a comb-type stirring blade were placed 10.8 kg (60 moles) of p-acetoxybenzoic acid, 2.49 kg (15 moles) of terephthalic acid, 0.83 kg (5 moles) of isophthalic acid and 5.45 kg (20.2 moles) of 4,4'-diacetoxydiphenyl, then brought to elevated temperature with stirring under nitrogen gas atmosphere, and polymerized at 330° C. for 1 hour. The polymerization was effected under powerful stirring while eliminating the acetic acid by-produced during the time. Thereafter the reaction system was cooled gradually and the reaction mixture was taken out of the system at 200° C. The yield of the reaction mixture was 13.25 kg, 97.8% of theoretical yield. The reaction mixture was ground into particles of 2.5 mm or less with a hammer mill mfd. by Hosokawa Micron K.K. The resulting product was further treated in a rotary kiln in nitrogen gas atmosphere at 280° C. for 3 hours to obtain a particulate wholly aromatic polyester comprising the following repeating structural units and having a flow temperature of 324° C. (hereinafter referred to as "liquid crystal polyester A"). The polymer showed optical anisotropy under applied pressure at 340° C. or above.

The repeating structural units of liquid crystal polyester A are as follows.

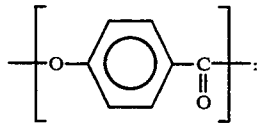:

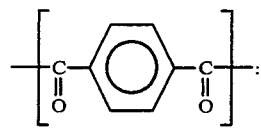:

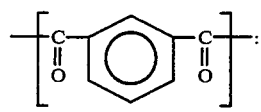:

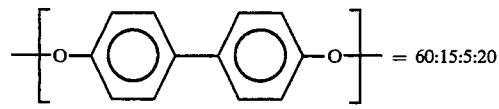 = 60:15:5:20

Referential Example 2 (Preparation of liquid crystal polyester B)

In a polymerization vessel having an anchor-type stirring blade were placed 5.52 kg (40 moles) of p-hydroxybenzoic acid, 4.06 kg (20 moles) of terephthalic acid chloride and 8 kg of xylene, then brought to elevated temperature with stirring under nitrogen gas atmosphere and, after a temperature of 160° C. was reached, reacted under reflux for 3 hours. The recovery of hydrochloric acid produced during the time was 95%. Thereafter the reaction mixture was cooled to 100° C., 3.72 kg (20 moles) of 4,4'-dihydroxydiphenyl and 4.49 kg (44 moles) of acetic anhydride were added thereto, the resulting mixture was brought up to a temperature of 140°, and reacted under reflux at 150° C. for 3 hours. After completion of the reaction, the reaction mixture was brought to elevated temperature and reacted at 330° C. for 3 hours. The polymerization was conducted under powerful stirring while eliminating xylene and acetic acid by-produced during the time. Thereafter the reaction system was cooled gradually and the reaction mixture was taken out of the system at 200° C. The yield of the reaction mixture was 11.02 kg, 97% of theoretical. The mixture was ground in the same manner as in Referential Example 1 and heat-treated in a rotary kiln in nitrogen gas atmosphere at 300° C. for 2 hours and subsequently at 370° C. for 2 hours to obtain a particulate liquid crystal polyester comprising the following repeating structural units and having a flow temperature of 380° C. (hereinafter referred to as "liquid crystal polyester B"). The polymer showed optical anisotropy under applied pressure at 390° C. or above.

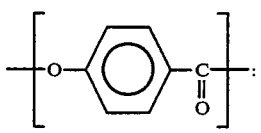:

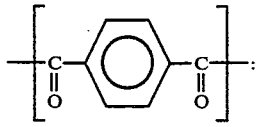:

-continued

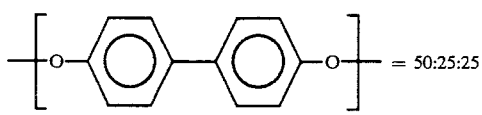 = 50:25:25

Referential Example 3 (Preparation of liquid crystal polyester C)

In a polymerization vessel equipped with a comb-type stirring blade were placed 8.1 kg (45 moles) of p-acetoxybenzoic acid and 6.9 kg (30 moles) of 6-acetoxy-2-naphthoic acid, then brought to elevated temperature with stirring in nitrogen gas atmosphere, and polymerized at 300° C. for 30 minutes, then at 320° C. for 30 minutes, and further under a reduced pressure of 8.0 Torr at 320° C. for 2 hours. During the time the by-produced acetic acid was continuously distilled out of the reaction system. Thereafter the system was cooled gradually and the reaction product was taken out of the system. The yield of the reaction mixture was 10.1 kg, 96.2% of the theoretical yield. The mixture was ground in the same manner as in Referential Example 1 and then treated in a rotary kiln under nitrogen gas atmosphere at 240° C. for 5 hours to obtain a particulate wholly aromatic polyester comprising the following repeating units and having a flow temperature of 260° C. (hereinafter referred to as "liquid crystal polyester C"). The polymer showed optical anisotropy in standing still at 320° C. or above.

The proportion of the repeating structural units of liquid crystal polyester C is as follows.

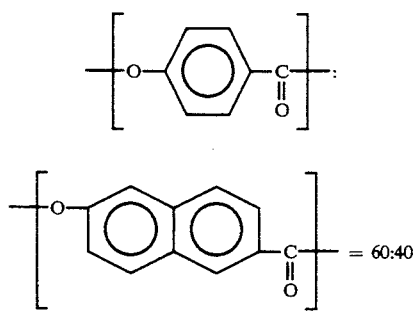 = 60:40

Referential Example 4 (Preparation of liquid crystal polyester D)

In a polymerization vessel having an anchor-type stirring blade were placed 5.4 kg (30 moles) of p-acetoxybenzoic acid and 1.92 kg (10 moles) of polyethylene terephthalate having an intrinsic viscosity of 0.65, then brought to elevated temperature with stirring in nitrogen gas atmosphere, reacted at 280° C. for 1 hour to distill most of the acetic acid of the reaction by-product out of the reaction system, succeedingly reacted under a vacuum of 0.5 Torr for 3 hours, and then the reaction mixture was taken out of the system. The mixture was ground in the same manner as in Referential Example 1 and then heat-treated in a hot-air circulating oven under nitrogen gas atmosphere at 220° C. for 5 hours to obtain a particulate liquid crystal polyester comprising the following repeating units and having a flow temperature of 250° C. (hereinafter referred to as "liquid crystal polyester D"). The polymer showed optical anisotropy in standing still at 280° C. or above. The proportion of the repeating structural units of liquid crystal polyester D is as follows.

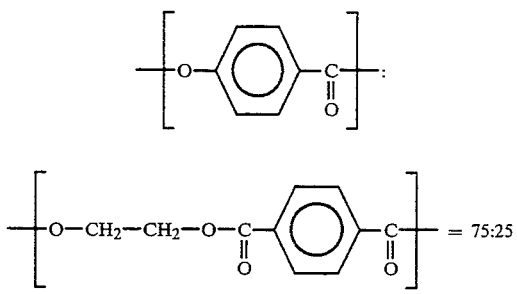 = 75:25

EXAMPLE 1–7

Comparative Examples 1–5

(Synthesis of POB oligomer)

POB oligomers of n-mers (n: 2, 3, 4, 5, 7, 9 and 12) were synthesized according to the following procedures. In a polymerization vessel having an anchor-type stirring blade whose inner atmosphere had been fully replaced with nitrogen, were placed 10 moles of p-hydroxybenzoic acid and 10(n−1)/n moles of acetic anhydride, then brought to elevated temperature with stirring in nitrogen gas atmosphere and, when the temperature reached 180° C., reacted under reflux for 3 hours to effect acetylation. Thereafter the temperature was raised up to 300° C. and the reaction was continued until the cessation of distillation of the acetic acid by-produced through acetylation and the acetic acid by-produced through condensation. Then the reaction system was cooled gradually and, while the reaction product was being crushed under powerful stirring, the product was taken out of the system after the temperature had reached 120° C. or below. The product was then ground by means of a Bantam mill (mfd. by Hosokawa Micron K.K.) into particles of 200 μm or less.

When calculated from the amount of distilled-out acetic acid of the by-product with the assumption that acetylation had been achieved to 100 percent, the number average polymerization degrees of the POB oligomers corresponding to n-mers (n being 2, 3, 4, 5, 7, 9 and 12) were respectively 1.8, 2.6, 3.5, 4.3, 6.2, 8.0 and 10.6. Further, the flow temperature of these oligomers and the temperature at which they show optical anisotropy were determined by the methods described before. The oligomer having a number average polymerization degree of 10.6 did not flow at a temperature of 350° C. or less, and did not show optical anisotropy even under applied pressure. These results are summarized in Table 1. Further, to confirm the terminal groups of these oligomers, the infrared absorption spectra of the oligomers were determined by the KBr method. As a result, a peak due to the —OH group was detected in the vicinity of 3500 cm$^{-1}$ but no peak at 1370 cm$^{-1}$ due to the

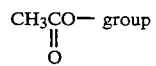

was detected in every oligomer. Accordingly, it has been revealed that the molecular end of every oligomer has been terminated by p-hydroxybenzoic acid which has undergone no acetylation.

Characteristic properties of the composition

With 100 parts by weight of liquid crystal polyester A and 67 parts by weight of a glass fiber (EFH 75-01, mfd. by Central Glass K.K.), was blended various POB oligomers synthesized by the method mentioned above in a Henschel mixer so as to give the compositions shown in Table 2, respectively. The resulting blend was melt-kneaded with a twin-screw extruder (PCM-30, mfd. by Ikegai Tekko K.K.) at 320°–330° C. to obtain pellets. In the same manner, pellets were obtained at a temperature of 330° C. from a composition comprising glass fiber and liquid crystal polyester containing no POB oligomer (Comparative Example 1).

First, thin wall fluidity was determined with the pellets obtained above, by injection molding according to the method described above. The injection was performed under the conditions of a cylinder temperature of two levels of 340° C. and 360° C., mold temperature of 130° C. and injection speed V of 60%. Test pieces for bending test and solder heat resistance test were molded in the same manner and the bending strength, flexural modulus, Izod impact strength without notch, heat distortion temperature and solder heat resistance were determined according to the methods described above. The results of these determinations are summarized in Table 2.

It is apparent from Table 2 that the resin compositions of Examples 1–7 according to the present invention are all improved in thin wall fluidity without appreciable loss in mechanical properties and heat resistances possessed by the composition containing no POB oligomer (Comparative Example 1). The resin composition (Comparative Example 2) incorporated with a POB oligomer having a number average polymerization degree of 1.8 as determined from the amount of distilled-out acetic acid and a flow temperature less than 160° C. is markedly improved in thin wall fluidity as compared with Comparative Example 1, but develops bubbles in the test piece and is greatly deteriorated in heat resistance. As to the systems incorporated with a POB oligomer having a flow temperature of 250° C. and a number average polymerization degree of 4.3 as determined from the amount of distilled-out acetic acid, the one in which the amount of oligomer added is less than 0.5 part by weight (Comparative Example 3) shows almost no fluidity improving effect, while the one in which the amount added is more than 10 parts by weight (Comparative Example 4) shows a marked fluidity improving effect, but develops bubbles in the molded article and is greatly deteriorated in heat resistance. On the other hand, the resin composition (Comparative Example 5) incorporated with a POB oligomer having a flow temperature of 315° C. and a number average polymerization degree of 8.0 as determined from the amount of distilled-out acetic acid shows no fluidity improving effect. Thus, since the flow temperature of the POB oligomer is only about 10° C. lower than that of the liquid crystal polyester, no fluidity improving effect is observed.

EXAMPLES 8–15

Comparative Examples 6–10

In the same manner as in Examples 1–7, a series of pellets having the compositions shown in Table 3 were obtained from 100 parts by weight of liquid crystal polyester B and various POB oligomers, at a melt-kneading temperature of 370°–380° C., The thin wall fluidity, mechanical properties and heat resistances were determined with the pellets thus obtained, in the same manner as in Examples 1–7. The thin wall fluidity was determined under conditions of a cylinder temperature of two levels of 360° C. and 380° C., mold temperature of 130° C. and injection speed V of 60%. The results of these determinations are summarized in Table 3.

It is an utterly unexpected result that all the resin compositions of Examples 8–15 according to the present invention are not only markedly improved in thin wall fluidity with virtually no loss in heat resistance possessed by the composition (Comparative Example 6) containing no POB oligomer but also greatly improved in bending strength and Izod impact strength. The resin composition (Comparative Example 7) incorporated with a POB oligomer having a flow temperature lower than 160° C. and the composition (Comparative Example 9) incorporated with more than 10 parts by weight of POB oligomer both develop bubbles in the test piece and are badly deteriorated in heat resistance, though they are improved in thin wall fluidity, bending strength and Izod impact strength. On the other hand, no fluidity improving effect is recognized with the composition (Comparative Example 8) incorporated with less than 0.5 part by weight of POB oligomer and the composition (Comparative Example 10) incorporated with a POB oligomer which does not flow even at a temperature exceeding 350° C.

EXAMPLES 16–19

Comparative Example 11

In the same manner as in Examples 1–7, a series of pellets having the compositions shown in Table 4 were obtained from 100 parts by weight of liquid crystal polyester B, 67 parts by weight of a glass fiber (REV-8, mfd. by Nippon Glass Fiber K.K.) and various POB polymers, at a melt-kneading temperature of 380° C. The thin wall fluidity, mechanical properties and heat resistances were determined with the pellets obtained above, in the same manner as in Examples 1–7. The thin wall fluidity was determined under conditions of a cylinder temperature of two levels of 380° C. and 400° C., mold temperature of 130° C. and injection speed V of 60%. The results of these determinations are collectively shown in Table 4.

The resin compositions of Examples 16–19 according to the present invention are all not only markedly improved in thin wall fluidity with virtually no loss in heat resistance possessed by the composition (Comparative Example 11) containing no POB oligomer, but also undergo an unexpected marked improvement in bending strength and Izod impact strength like in Examples 8–15.

EXAMPLES 20 and 21

Comparative Examples 12 and 13

Table 5 shows the results obtained with resin compositions prepared by melt-kneading mixtures of 100 parts by weight of liquid crystal polyester C with various POB oligomers at a temperature of 260°–265° C., in the same manner as in Examples 1–7. Both of the resin compositions of Examples 20 and 21 according to the present invention are markedly improved in thin wall fluidity with no deterioration in mechanical properties and heat resistances possessed by the composition (Comparative Example 12) incorporated with no oligomer. The composition (Comparative Example 13) incorporated with an oligomer having a flow temperature lower by 10° C. than that of liquid crystal polyester C shows virtually no fluidity improving effect.

EXAMPLES 22-24

Comparative Examples 14 and 15

Table 6 shows the results obtained with resin compositions prepared by melt-kneading mixtures of 100 parts by weight of liquid crystal polyester D, 67 parts by weight of a glass fiber (EFH75-01, mfd. by Central Glass K.K.) and various POB oligomers at a temperature of 260° C., in the same manner as in Examples 1-7. The compositions of Examples 22-24 according to the present invention are all markedly improved in thin wall fluidity without deterioration in the mechanical property and heat resistance possessed by the composition (Comparative Example 14) incorporated with no oligomer. The composition (Comparative Example 15) incorporated with an oligomer having the same flow temperature as that of liquid polyester D shows virtually no fluidity improving effect.

EXAMPLES 25-28

Comparative Examples 16-19

(Synthesis of copolymer oligomer)

A copolymer oligomer having the same repeating structural unit as that of liquid crystal polyester A was synthesized according to the following procedures. In a polymerization vessel having an anchor-type stirring blade were placed 1080 g (6 moles) of p-acetoxybenzoic acid, 249 g (1.5 moles) of terephthalic acid, 83 g (0.5 mole) of isophthalic acid and 540 g (2 moles) of 4,4'-diacetoxydiphenyl, then brought to elevated temperature with stirring in nitrogen gas atmosphere and reacted at 310° C. When 510 g (8.5 moles) of acetic acid had been distilled out, the temperature was lowered to 280° C., 138 g (1 mole) of p-hydroxybenzoic acid was added, the reaction was continued till the cessation of distilling out of acetic acid, and the reaction mixture was taken out of the system. The terminal acetyl groups in the reaction mixture had been converted in theory into hydroxyl group terminals as the result of the reaction with the carboxyl group of p-hydroxybenzoic acid. The reaction mixture was ground by means of a Bantam mill (mfd. by Hosokawa Micron K.K.) into particles of 200 μm or less, and the flow temperature and optical anisotropy were determined by the above-mentioned methods and found to be 255° C. and 300° C., respectively.

(Characteristic properties of composition)

A composition comprising 100 parts by weight of liquid polyester A and 67 parts by weight of a glass fiber (EFH 75-01, mfd. by Central Glass K.K.) (namely the composition of Comparative Example 1) and a composition comprising 100 parts by weight of liquid polyester B and 67 parts of weight of a glass fiber (REV-8, mfd. by Nippon Glass Fiber K.K.) (namely, the composition of Comparative Example 11) were respectively incorporated with the copolymer oligomer synthesized by the above-mentioned method so as to give the compositions shown in Table 7, and the characteristic properties of the resulting resin compositions were determined in the same manner as in Examples 1-7 and Examples 16-19. The results obtained are shown in Table 7. The resin compositions of Examples 25-28 according to the present invention are all markedly improved in thin wall fluidity without deterioration in the mechanical property and heat resistance possessed by the compositions (Comparative Examples 1 and 11) incorporated with no oligomer. In particular, the resin compositions according to the present invention based on liquid crystal polyester B (Examples 27 and 28) are improved also in bending strength as the result of the addition of the oligomer. On the other hand, the resin compositions (Comparative Examples 16 and 18) incorporated with less than 0.5 part by weight of the oligomer show virtually no fluidity improving effect, and the compositions (Comparative Examples 17 and 19) incorporated with more than 10 parts by weight of the oligomer develop bubbles in the molded article and are badly deteriorated in heat resistance although greatly improved in fluidity.

EXAMPLES 29-31

Comparative Examples 20-22

Mixture systems of liquid crystal polyester A and liquid crystal polyester D will be described below.

Liquid crystal polyester A and liquid crystal polyester D were blended in a Henschel mixer so as to give weight ratios of A/D of 70/30, 50/50 and 30/70, and melt-kneaded through a twin-screw extruder (PCM-30, mfd. by Ikegai Tekko K.K.) at 320°-330° C. to obtain pellets. The flow temperatures of the pellets determined by the above-mentioned method were found to be 303° C., 285° C. and 273° C., respectively.

In the same manner, pellets were obtained of compositions comprising liquid crystal polyester A, liquid crystal polyester D and a glass fiber (EFH 75-01, mfd. by Central Glass K.K.) in weight ratios of 70/30/67, 50/50/67 and 30/70/67 (Comparative Examples 20, 21, and 22, respectively) and of resin compositions prepared by adding to said respective compositions 3 parts by weight of an oligomer having a number average polymerization degree of 4.3 as determined from the amount of distilled-out acetic acid and a flow temperature of 250° C. (Examples 29, 30 and 31, respectively). The melt-kneading temperature was 320°-330° C. for all pellets. These pellets were injection molded to determine the thin wall fluidity, mechanical property and heat resistance in the same manner as in Examples 1-7.

All of the compositions were molded at a molding temperature of 330° C. and mold temperature of 130° C. The results of these determinations are shown in Table 8.

It is apparent from Table 8 that also in the mixture systems of liquid crystal polyester A and liquid crystal polyester D, the resin compositions containing POB oligomer are improved in thin wall fluidity with virtually no deterioration in the mechanical property and heat resistance possessed by the composition containing no POB oligomer.

Effect of the Invention

The composition of the present invention is markedly improved in fluidity, particularly fluidity in forming thin-walled articles, with virtually no deterioration in the mechanical property and heat resistance inherent to liquid crystal polyester. Thus, the composition is highly useful for use in electronic parts for which high level of performances are required.

TABLE 1

| Theoretical value of number | 2 | 3 | 4 | 5 | 7 | 9 | 12 |

TABLE 1-continued

| average polymerization degree of POB oligomer | | | | | | | |
|---|---|---|---|---|---|---|---|
| Numbr average polymerization degree of POB oligomer determined from amount of distilled-out acetic acid | 1.8 | 2.6 | 3.5 | 4.3 | 6.2 | 8.0 | 10.6 |
| Flow temperature (°C.) | 155 | 192 | 228 | 250 | 288 | 315 | Does not flow |
| Temperature showing optical anisotropy (°C.) | 176 | 217 | 230 | 254 | 298 | 324 | No observed |

TABLE 2

| | Liquid crystal polyester A (part by weight) | Glass fiber (part by weight) | Kind of POB oligomer | | Amount of POB oligomer added (part by weight) | Thin wall fluidity | |
|---|---|---|---|---|---|---|---|
| | | | Number average polymerization degree[1] | Flow temperature (°C.) | | 340° C. (mm) | 360° C. (mm) |
| Comparative Example 1 | 100 | 67 | — | — | — | 15.4 | 21.8 |
| Comparative Example 2 | 100 | 67 | 1.8 | 155 | 3 | 27.3* | 38.0* |
| Example 1 | 100 | 67 | 2.6 | 192 | 3 | 24.8 | 34.4 |
| Example 2 | 100 | 67 | 3.5 | 228 | 3 | 23.7 | 31.4 |
| Example 3 | 100 | 67 | 4.3 | 250 | 1 | 19.0 | 26.6 |
| Example 4 | 100 | 67 | 4.3 | 250 | 3 | 23.0 | 30.7 |
| Example 5 | 100 | 67 | 4.3 | 250 | 5 | 28.4 | 38.0 |
| Example 6 | 100 | 67 | 4.3 | 250 | 8 | 37.1 | 46.0 |
| Comparative Example 3 | 100 | 67 | 4.3 | 250 | 0.3 | 15.6 | 22.4 |
| Comparative Example 4 | 100 | 67 | 4.3 | 250 | 12 | 46.0* | 46.0* |
| Example 7 | 100 | 67 | 6.2 | 288 | 3 | 21.7 | 28.6 |
| Comparative Example 5 | 100 | 67 | 8.0 | 315 | 3 | 15.0 | 21.3 |

| | Mechanical property[2] | | | Heat resistance[2] | |
|---|---|---|---|---|---|
| | Bending strength (kg/cm$^2$) | Flexural modulus (kg/cm$^2$) | Izod impact strength (kgcm/cm) | Heat distortion temperature (°C.) | Solder heat resistance (°C.) |
| Comparative Example 1 | 1,460 | 131,000 | 39 | 276 | 300 |
| Comparative Example 2 | 1,430 | 130,000 | 25 | 265 | 285* |
| Example 1 | 1,460 | 134,000 | 33 | 272 | 290 |
| Example 2 | 1,490 | 133,000 | 35 | 273 | 295 |
| Example 3 | 1,470 | 131,000 | 38 | 276 | 300 |
| Example 4 | 1,520 | 131,000 | 36 | 274 | 295 |
| Example 5 | 1,510 | 133,000 | 35 | 273 | 295 |
| Example 6 | 1,450 | 131,000 | 33 | 271 | 290 |
| Comparative Example 3 | 1,460 | 132,000 | 38 | 277 | 300 |
| Comparative Example 4 | 1,330 | 128,000 | 27 | 262 | 280* |
| Example 7 | 1,520 | 131,000 | 38 | 276 | 295 |
| Comparative Example 5 | 1,440 | 133,000 | 37 | 276 | 300 |

Note:
[1] Value determined from amount of distilled-out acid
[2] Test piece molded at 350° C.
*Test piece develops bubbles.

TABLE 3

| | Liquid crystal polyester B (part by weight) | Kind of POB oligomer | | Amount of POB oligomer added (part by weight) | Thin wall fluidity | |
|---|---|---|---|---|---|---|
| | | Number average polymerization degree[1] | Flow temperature (°C.) | | 360° C. (mm) | 380° C. (mm) |
| Comparative Example 6 | 100 | — | — | — | 0 | 6.2 |
| Comparative Example 7 | 100 | 1.8 | 155 | 3 | 9.5* | 27.3* |
| Example 8 | 100 | 2.6 | 192 | 3 | 8.7 | 24.0 |
| Example 9 | 100 | 3.5 | 228 | 3 | 7.2 | 23.6 |
| Example 10 | 100 | 4.3 | 250 | 1 | 2.0 | 11.8 |
| Example 11 | 100 | 4.3 | 250 | 3 | 5.2 | 21.1 |
| Example 12 | 100 | 4.3 | 250 | 5 | 11.2 | 29.1 |
| Example 13 | 100 | 4.3 | 250 | 8 | 16.3 | 34.3 |
| Comparative Example 8 | 100 | 4.3 | 250 | 0.3 | 0 | 7.2 |
| Comparative Example 9 | 100 | 4.3 | 250 | 12 | 24.3* | 39.2* |
| Example 14 | 100 | 6.2 | 288 | 3 | 3.5 | 17.9 |
| Example 15 | 100 | 8.0 | 315 | 3 | 1.3 | 13.0 |
| Comparative Example 10 | 100 | 10.6 | Does not flow | 3 | 0 | 6.9 |

| | Mechanical property[2] | | | Heat resistance[2] | |
|---|---|---|---|---|---|
| | Bending strength | Flexural modulus | Izod impact strength | Heat distortion tempera- | Solder heat resistance |

TABLE 3-continued

|  | (kg/cm²) | (kg/cm²) | (kgcm/cm) | ture (°C.) | (*C) |
|---|---|---|---|---|---|
| Comparative Example 6 | 680 | 46,000 | 11 | 305 | 330 |
| Comparative Example 7 | 800 | 47,000 | 23 | 295 | 315* |
| Example 8 | 920 | 48,000 | 29 | 303 | 330 |
| Example 9 | 930 | 50,000 | 31 | 306 | 325 |
| Example 10 | 740 | 48,000 | 23 | 308 | 330 |
| Example 11 | 900 | 50,000 | 29 | 304 | 325 |
| Example 12 | 970 | 51,000 | 38 | 301 | 325 |
| Example 13 | 930 | 52,000 | 36 | 298 | 320 |
| Comparative Example 8 | 690 | 46,000 | 12 | 306 | 330 |
| Comparative Example 9 | 830 | 44,000 | 24 | 290 | 310* |
| Example 14 | 830 | 48,000 | 26 | 303 | 325 |
| Example 15 | 750 | 47,000 | 18 | 305 | 325 |
| Comparative Example 10 | 660 | 46,000 | 12 | 304 | 330 |

Note:
[1] Value determined from amount of distilled-out acid
[2] Test piece molded at 390°C.
*Test piece develops bubbles.

TABLE 4

|  | Liquid crystal polyester B (part by weight) | Glass fiber (part by weight) | Kind of POB oligomer | | Amount of POB oligomer added (part by weight) | Thin wall fluidity | |
|---|---|---|---|---|---|---|---|
|  |  |  | Number average polymerization degree[1] | Flow temperature (°C.) |  | 380° C. (mm) | 400° C. (mm) |
| Comparative Example 11 | 100 | 67 | — | — | — | 5.4 | 14.5 |
| Example 16 | 100 | 67 | 2.6 | 192 | 3 | 14.4 | 34.1 |
| Example 17 | 100 | 67 | 3.5 | 228 | 3 | 15.2 | 30.5 |
| Example 18 | 100 | 67 | 4.3 | 250 | 3 | 13.5 | 28.5 |
| Example 19 | 100 | 67 | 6.2 | 288 | 3 | 12.5 | 25.3 |

|  | Mechanical property[2] | | | Heat resistance[2] | |
|---|---|---|---|---|---|
|  | Bending strength (kg/cm²) | Flexural modulus (kg/cm²) | Izod impact strength (kgcm/cm) | Heat distortion temperature (°C.) | Solder heat resistance (°C.) |
| Comparative Example 11 | 1,000 | 106,000 | 12 | 335 | 345 |
| Example 16 | 1,180 | 108,000 | 20 | 330 | 340 |
| Example 17 | 1,150 | 107,000 | 21 | 332 | 340 |
| Example 18 | 1,140 | 109,000 | 19 | 334 | 340 |
| Example 19 | 1,010 | 108,000 | 17 | 336 | 340 |

Note:
[1] Value determined from amount of distilled-out acid
[2] Test piece molded at 400° C.

TABLE 5

|  | Liquid crystal polyester C (part by weight) | Kind of POB oligomer | | Amount of POB oligomer added (part by weight) | Thin wall fluidity | |
|---|---|---|---|---|---|---|
|  |  | Number average polymerization degree[1] | Flow temperature (°C.) |  | 260° C. (mm) | 280° C. (mm) |
| Comparative Example 12 | 100 | — | — | — | 17.6 | 23.2 |
| Example 20 | 100 | 2.6 | 192 | 3 | 31.0 | 39.8 |
| Example 21 | 100 | 3.5 | 228 | 3 | 29.0 | 37.2 |
| Comparative Example 13 | 100 | 4.3 | 250 | 3 | 18.5 | 24.3 |

|  | Mechanical property[2] | | Heat resistance[2] | |
|---|---|---|---|---|
|  | Bending strength (kg/cm²) | Flexural modulus (kg/cm²) | Heat distortion temperature (°C.) | Solder heat resistance (°C.) |
| Comparative Example 12 | 1,110 | 50,000 | 177 | 225 |
| Example 20 | 1,060 | 48,000 | 175 | 220 |
| Example 21 | 1,080 | 48,000 | 176 | 225 |
| Comparative Example 13 | 1,120 | 49,000 | 176 | 225 |

Note:
[1] Value determined from amount of distilled-out acid
[2] Test piece molded at 290° C.

TABLE 6

| | Liquid crystal polyester D (part by weight) | Glass fiber (part by weight) | Kind of POB oligomer | | Amount of POB oligomer added (part by weight) | Thin wall fluidity 270° C. (mm) | Mechanical property[2] | | Heat resistance[2] |
|---|---|---|---|---|---|---|---|---|---|
| | | | Number average polymerization degree[1] | Flow temperature (°C.) | | | Bending strength (kg/cm$^2$) | Flexural modulus (kg/cm$^2$) | Heat distortion temperature (°C.) |
| Comparative Example 14 | 100 | 67 | — | — | — | 20.3 | 1,800 | 115,000 | 200 |
| Example 22 | 100 | 67 | 2.6 | 192 | 2 | 33.8 | 1,790 | 113,000 | 198 |
| Example 23 | 100 | 67 | 2.6 | 192 | 5 | 42.2 | 1,760 | 112,000 | 195 |
| Example 24 | 100 | 67 | 3.5 | 228 | 3 | 35.5 | 1,780 | 113,000 | 198 |
| Comparative Example 15 | 100 | 67 | 4.3 | 250 | 3 | 21.4 | 1,810 | 116,000 | 199 |

Note:
[1] Value determined from amount of distilled-out acid
[2] Test piece molded at 270° C.

TABLE 7

| | Liquid crystal polyester | | Glass fiber (part by weight) | Copolymer oligomer | | Thin wall fluidity | | Mechanical property[1] | | Heat resistance[1] | |
|---|---|---|---|---|---|---|---|---|---|---|---|
| | Kind | (Part by weight) | | Flow temperature (°C.) | Amount added (part by weight) | 360° C. (mm) | 400° C. (mm) | Bending strength (kg/cm$^2$) | Flexural modulus (kg/cm$^2$) | Heat distortion temperature (°C.) | Solder heat resistance (°C.) |
| Comparative Example 1 | A | 100 | 67 | — | — | 21.8 | — | 1,460 | 131,000 | 276 | 300 |
| Example 25 | A | 100 | 67 | 255 | 3 | 29.5 | — | 1,550 | 130,000 | 275 | 295 |
| Example 26 | A | 100 | 67 | 255 | 8 | 42.3 | — | 1,470 | 131,000 | 273 | 295 |
| Comparative Example 16 | A | 100 | 67 | 255 | 0.3 | 22.0 | — | 1,460 | 132,000 | 276 | 300 |
| Comparative Example 17 | A | 100 | 67 | 255 | 12 | 46.0* | — | 1,380 | 127,000 | 265 | 285* |
| Comparative Example 11 | B | 100 | 67 | — | — | — | 14.5 | 1,000 | 106,000 | 335 | 345 |
| Example 27 | B | 100 | 67 | 255 | 3 | — | 27.9 | 1,210 | 107,000 | 333 | 340 |
| Example 28 | B | 100 | 67 | 255 | 8 | — | 38.3 | 1,160 | 105,000 | 330 | 335 |
| Comparative Example 18 | B | 100 | 67 | 255 | 0.3 | — | 15.1 | 1,010 | 106,000 | 334 | 345 |
| Comparative Example 19 | B | 100 | 67 | 255 | 12 | — | 45.0* | 1,070 | 103,000 | 322 | 325* |

Note:
[1] Test piece of composition based on liquid crystal polyester A was molded at 350° C.; that based on liquid crystal polyester B at 400° C.
*Test piece develops bubbles.

TABLE 8

| | Liquid crystal polyester A (part by weight) | Liquid crystal polyester D (part by weight) | Glass fiber (part by weight) | Kind of POB oligomer | | Amount of POB oligomer added (part by weight) | Thin wall fluidity 330° C. (mm) |
|---|---|---|---|---|---|---|---|
| | | | | Number average polymerization degree[1] | Flow temperature (°C.) | | |
| Comparative Example 20 | 70 | 30 | 67 | — | — | — | 16.8 |
| Example 29 | 70 | 30 | 67 | 4.3 | 250 | 3 | 28.0 |
| Comparative Example 21 | 50 | 50 | 67 | — | — | — | 24.0 |
| Example 30 | 50 | 50 | 67 | 4.3 | 250 | 3 | 37.1 |
| Comparative Example 22 | 30 | 70 | 67 | — | — | — | 34.3 |
| Example 31 | 30 | 70 | 67 | 4.3 | 250 | 3 | 46.0 |

| | Mechanical property[2] | | Heat resistance[2] | |
|---|---|---|---|---|
| | Bending strength (kg/cm$^2$) | Flexural modulus (kg/cm$^2$) | Heat distortion temperature (°C.) | Solder heat resistance (°C.) |
| Comparative Example 20 | 1,360 | 116,000 | 263 | 285 |
| Example 29 | 1,380 | 115,000 | 262 | 285 |
| Comparative Example 21 | 1,430 | 113,000 | 245 | 275 |
| Example 30 | 1,420 | 114,000 | 242 | 275 |
| Comparative Example 22 | 1,530 | 110,000 | 231 | 270 |
| Example 31 | 1,580 | 112,000 | 229 | 270 |

Note:
[1] Value determined from amount of distilled-out acid
[2] Test piece molded at 330° C.

What is claimed is:

100 parts by weight of a liquid crystal polyester, and 0.5-10 parts by weight of an oligomer of which number average polymerization degree determined from the amount of distilled-out acetic acid is 2.6-8.0, the oligomer having a carboxyl group at one terminal end and a hydroxyl group at the other terminal end, showing optical anisotropy in the molten state, comprising a repeating structure of the formula

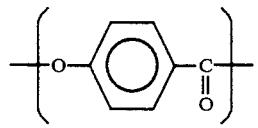

and having a flow temperature which is in the range of 160°-350° C. and is at least 20° C. lower than the flow temperature of the liquid crystal polyester to be combined therewith, said flow temperature being the temperature at which a heat-molten polymer or oligomer shows a melt viscosity of 48,000 poises when extruded through a nozzle by using a capillary rheometer fitted with a nozzle 1 mm in inner diameter and 10 mm in length at a temperature-increasing rate of 4° C./minute.

2. A liquid crystal polyester resin composition improved in fluidity which comprises 100 parts by weight of a liquid crystal polyester, and 0.5-10 parts by weight of an oligomer which is a copolymer oligomer prepared from p-hydroxybenzoic acid, an aromatic dicarboxylic acid and an aromatic diol, of which number average polymerization degree determined from the amount of distilled-out acetic acid is 2.6-8.0, the oligomer having a carboxyl group at one terminal end and a hydroxyl group at the other terminal end, showing optical anisotropy in the molten state, comprising a repeating structure of the formula

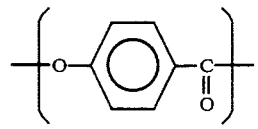

and having a flow temperature which is in the range of 160°-350° C. and is at least 20° C. lower than the flow temperature of the liquid crystal polyester to be combined therewith, said flow temperature being the temperature at which a heat-molten polymer or oligomer shows a melt viscosity of 48.000 poises when extruded through a nozzle by using a capillary rheometer fitted with a nozzle 1 mm in inner diameter and 10 mm in length at a temperature-increasing rate of 4° C./minute.

3. A liquid crystal polyester resin composition improved in fluidity which comprises 100 parts by weight of a liquid crystal polyester, and 0.5-10 parts by weight of an oligomer which is a copolymer oligomer prepared from p-hydroxybenzoic acid, an aromatic dicarboxylic acid which is at least one member selected from the group consisting of terephthalic acid and isophthalic acid, and an aromatic diol, of which number average polymerization degree determined from the amount of distilled-out acetic acid is 2.6-8.0, the oligomer having a carboxyl group at one terminal end and a hydroxyl group at the other terminal end, showing optical anisotropy in the molten state, comprising a repeating structure of the formula

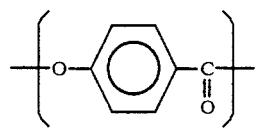

and having a flow temperature which is in the range of 160°-350° C. and is at least 20° C. lower than the flow temperature of the liquid crystal polyester to be combined therewith, said flow temperature being the temperature at which a heat-molten polymer or oligomer shows a melt viscosity of 48,000 poises when extruded through a nozzle by using a capillary rheometer fitted with a nozzle 1 mm in inner diameter and 10 mm in length at a temperature-increasing rate of 4° C./minute.

4. A liquid crystal polyester resin composition improved in fluidity which comprises 100 parts by weight of a liquid crystal polyester, and 0.5-10 parts by weight of an oligomer which is a copolymer oligomer prepared from p-hydroxybenzoic acid, an aromatic dicarboxylic acid and an aromatic diol which is at least one member selected from the group consisting of hydroquinone, resorcinol and 4,4'-dihydroxydiphenyl, of which number average polymerization degree determined from the amount of distilled-out acetic acid is 2.6-8.0, the oligomer having a carboxyl group at one terminal end and a hydroxyl group at the other terminal end, showing optical anisotropy in the molten state, comprising repeating structure of the formula

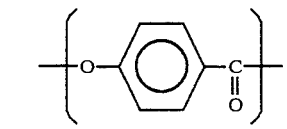

and having a flow temperature which is in the range of 160°-350° C. and is at least 20° C. lower than the flow temperature of the liquid crystal polyester to be combined therewith, said flow temperature being the temperature at which a heat-molten polymer or oligomer shows a melt viscosity of 48,000 poises when extruded through a nozzle by using a capillary rheometer fitted with a nozzle 1 mm in inner diameter and 10 mm in length at a temperature-increasing rate of 4° C./minute.

* * * * *